US010845647B2

(12) United States Patent
Seo et al.

(10) Patent No.: US 10,845,647 B2
(45) Date of Patent: Nov. 24, 2020

(54) BACKLIGHT UNIT, DISPLAY DEVICE, AND METHOD OF MANUFACTURING DISPLAY DEVICE

(71) Applicant: Samsung Display Co. Ltd., Yongin-si (KR)

(72) Inventors: Woo Suk Seo, Yongin-si (KR); Sung Chul Kim, Seongnam-si (KR); Won Jin Kim, Hwaseong-si (KR); Jung Hyun Kim, Suwon-si (KR); Seok Hyun Nam, Seoul (KR); Si Joon Song, Suwon-si (KR); Kwang Wook Choi, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 121 days.

(21) Appl. No.: 16/042,613

(22) Filed: Jul. 23, 2018

(65) Prior Publication Data
US 2019/0056623 A1 Feb. 21, 2019

(30) Foreign Application Priority Data

Aug. 16, 2017 (KR) .......................... 10-2017-0103675

(51) Int. Cl.
*G02F 1/13357* (2006.01)
(52) U.S. Cl.
CPC .................. *G02F 1/133615* (2013.01); *G02F 2001/133614* (2013.01); *G02F 2201/50* (2013.01); *G02F 2202/36* (2013.01)
(58) Field of Classification Search
CPC ... G02F 1/133615; G02F 2001/133331; G02F 1/133305; G02F 2001/133614; G02F 2201/50; G02F 2202/36; G02B 6/0026; G02B 6/0093

USPC .......................................................... 349/65
See application file for complete search history.

(56) References Cited

U.S. PATENT DOCUMENTS

| 2015/0234111 | A1* | 8/2015 | Lee ..................... G02B 6/0091 |
| | | | 362/608 |
| 2016/0091657 | A1* | 3/2016 | Yang ................ G02F 1/133615 |
| | | | 362/608 |
| 2017/0097457 | A1* | 4/2017 | Park ..................... G02B 6/0026 |

FOREIGN PATENT DOCUMENTS

| EP | 3088950 | 11/2016 |
| KR | 1020160137930 | 12/2016 |
| KR | 1020180062497 | 6/2018 |
| WO | 2016032885 | 3/2016 |

OTHER PUBLICATIONS

Extended European Search Report—European Application No. 18187202.9 dated Nov. 29, 2018, citing references listed within.

* cited by examiner

*Primary Examiner* — Nathanael R Briggs
*Assistant Examiner* — William D Peterson
(74) *Attorney, Agent, or Firm* — Cantor Colburn LLP

(57) ABSTRACT

A display device includes a backlight unit and a display panel disposed above the backlight unit, where the backlight unit includes a light guide plate, a housing which is disposed at one side of the light guide plate and accommodates a wavelength converting member, and a flexible glass film which covers one side of the housing, and a first laser welding part is disposed between the flexible glass film and the housing.

21 Claims, 15 Drawing Sheets

BACKLIGHT UNIT, DISPLAY DEVICE, AND METHOD OF MANUFACTURING DISPLAY DEVICE

This application claims priority to Korean Patent Application No. 10-2017-0103675, filed on Aug. 16, 2017 and all the benefits accruing therefrom under 35 U.S.C. § 119, the content of which in its entirety is herein incorporated by reference.

BACKGROUND

1. Field

Exemplary embodiments of the invention relate to a backlight unit, a display device, and a method of manufacturing the display device.

2. Description of the Related Art

Liquid crystal display ("LCD") devices occupy a very large portion in information display technology. An LCD device displays information by light emitted by liquid crystal inserted between both glass substrates and power applied through an electrode above and below the glass substrates and converted in each liquid crystal.

Because the LCD device is a light receiving element that cannot emit light by itself and displays an image by adjusting transmittance of light entering from the outside, the LCD device desires a separate device, i.e., backlight unit, for irradiating a display panel with light.

Nowadays, a light emitting diode ("LED"), which is a semiconductor light emitting device that emits light when current flows, is getting the spotlight as a light source of the backlight unit of the LCD device. An LED is widely being used as the backlight unit of a lighting device, an electronic display board, and various other display devices due to its various advantages such as long service life, low power consumption, quick response speed, and excellent initial driving characteristics, and an application field thereof is gradually expanding.

When an LED light source is used, quantum dots are used to improve color purity. A quantum dot emits light when an excited electron transitions from a conduction band to a valence band, and has a characteristic in that a wavelength varies depending on a particle size even in the case of the same material. Because the quantum dot emits light having a shorter wavelength as the size of the quantum dot decreases, light of a desired wavelength band may be obtained by adjusting the size of the quantum dot.

Because a quantum dot material is mostly sealed in a sealing material such as glass, there is a concern in that the sealing material may be damaged due to an external impact. Also, because a component such as cadmium (Cd) is included inside the quantum dot material, the component may cause environmental pollution when the component is leaked to the outside. Consequently, nowadays, studies for preventing damage to a sealing material that seals a quantum dot material while realizing white light of high color reproducibility are being carried out.

SUMMARY

Exemplary embodiments of the invention provide a backlight unit capable of accurately maintaining alignment.

Exemplary embodiments of the invention also provide a backlight unit capable of reliably fixing each component without deterioration of optical characteristics.

It should be noted that advantages and features of the invention are not limited to the above-described advantages and features, and other advantages and features of the invention will be apparent to those skilled in the art from the following descriptions.

To achieve the above advantages and features, according to an exemplary embodiment of the invention, a backlight unit includes a light guide plate, a housing which is disposed at one side of the light guide plate and accommodates a wavelength converting member, and a flexible glass film which covers one side of the housing, where a first laser welding part is disposed between the flexible glass film and the housing.

According to an exemplary embodiment of the invention, a display device includes a backlight unit and a display panel disposed above the backlight unit, where the backlight unit includes a light guide plate, a housing which is disposed at one side of the light guide plate and accommodates a wavelength converting member, and a flexible glass film which covers one side of the housing, and a first laser welding part is disposed between the flexible glass film and the housing.

According to an exemplary embodiment of the invention, a method of manufacturing a display device includes preparing a light guide plate and a housing which is disposed at one side of the light guide plate and accommodates a wavelength converting member, and placing a flexible glass film at one side of the housing and welding the housing and the flexible glass film using a femtosecond laser.

BRIEF DESCRIPTION OF THE DRAWINGS

The above and other advantages and features of the invention will become more apparent by describing exemplary embodiments thereof in detail with reference to the attached drawings, in which.

DETAILED DESCRIPTION

Figure 1:
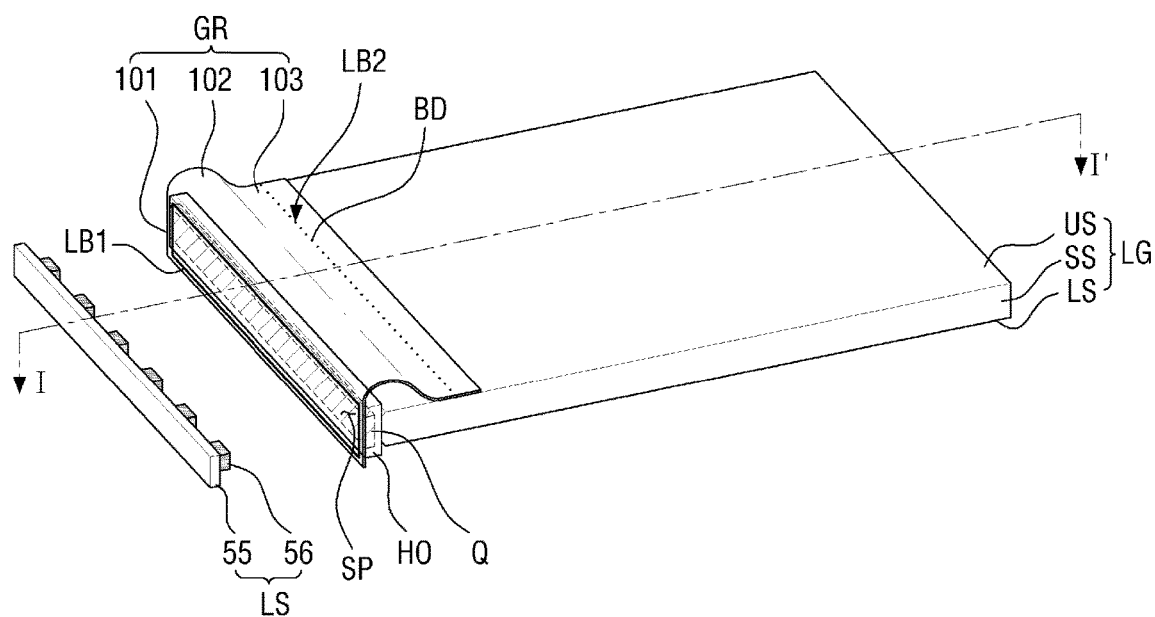
FIG. 1 is a perspective view of an exemplary embodiment of a backlight unit according to the invention.

The advantages and features of the invention and methods for achieving the advantages and features will be apparent by referring to the exemplary embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

Where an element is described as being related to another element such as being "on" another element or "located on" a different layer or a layer, includes both a case where an element is located directly on another element or a layer and a case where an element is located on another element via another layer or still another element. In contrast, where an element is described as being is related to another element such as being "directly on" another element or "located directly on" a different layer or a layer, indicates a case where an element is located on another element or a layer with no intervening element or layer therebetween. In the entire description of the invention, the same drawing reference numerals are used for the same elements across various drawing figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the drawing figures. It will be understood that relative terms are intended to encompass different orientations of the device in addition to the orientation depicted in the drawing figures. For example, if the device in one of the drawing figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the drawing figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the drawing figures are schematic in nature and their shapes are not intended to illustrate the precise shape of a region and are not intended to limit the scope of the claims.

Hereinafter, embodiments of the invention will be described with reference to the attached drawings.

Figure 2:
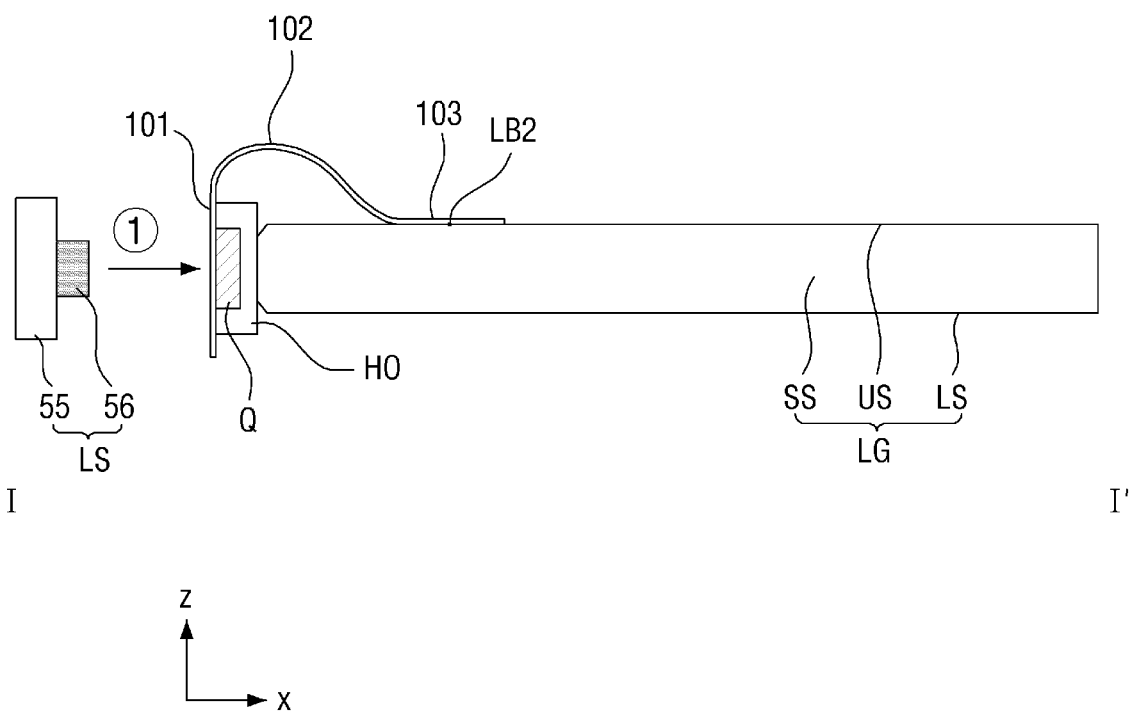
FIG. 2 is a cross-sectional view taken along line I-I' of FIG. 1.
Figure 3:
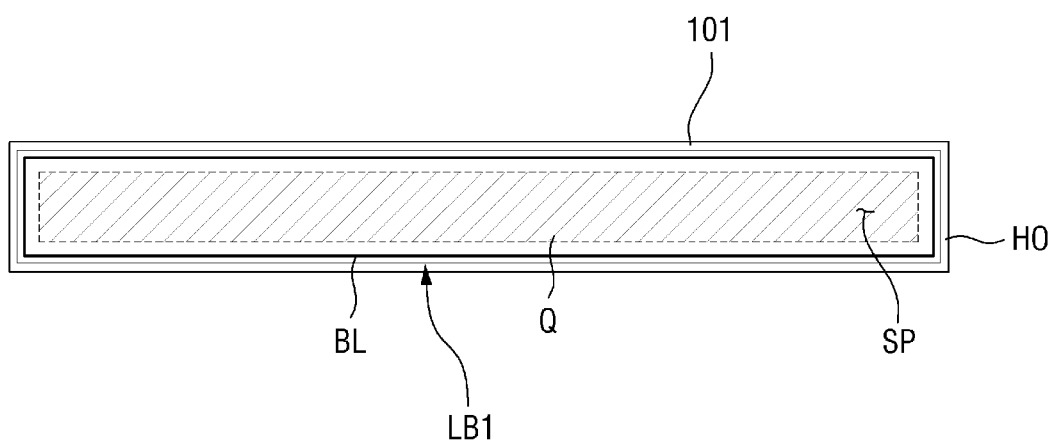
FIG. 3 is an arrangement view seen in one direction of FIG. 2.
Figure 4:
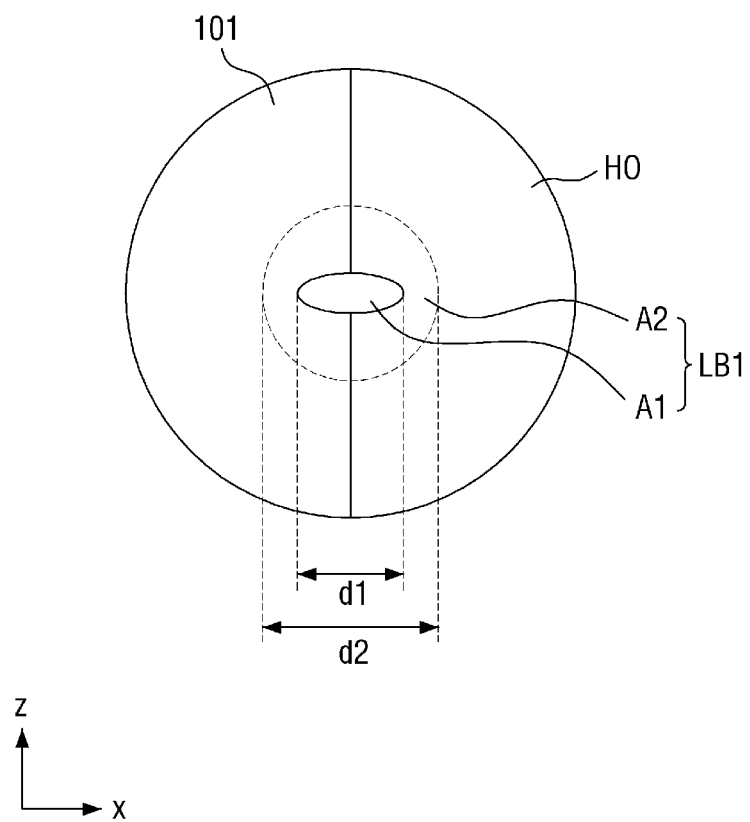
FIG. 4 is an enlarged view of a part of the backlight unit according to the exemplary embodiment of FIG. 1.

FIG. 1 is a perspective view of a backlight unit according to an exemplary embodiment of the invention. FIG. 2 is a cross-sectional view taken along line I-I' of FIG. 1. FIG. 3 is an arrangement view seen in one direction of FIG. 2. FIG. 4 is an enlarged view of a part of the backlight unit according to the exemplary embodiment of FIG. 1.

Referring to FIGS. 1 to 4, a backlight unit according an exemplary embodiment of the invention includes a light guide plate LG, a housing HO which is disposed at one side of the light guide plate LG and accommodates a wavelength converting member Q, and a flexible glass film GR which covers the housing HO.

The light guide plate LG may guide received light and provide the light to a display panel (not illustrated), which will be described below.

According to an exemplary embodiment, the light guide plate LG may include an upper surface US and a lower surface LS opposing each other and a side surface SS connecting the upper surface US and the lower surface LS.

Light provided from a light source LS may be projected via the upper surface US of the light guide plate LG. That is, the light guide plate LG may guide light provided from the light source LS to be projected toward the upper surface US or via the upper surface. That is, the upper surface US may be a light output surface.

Although FIG. 1 illustrates a case in which the upper surface US includes a flat surface, the shape of the upper surface US is not limited thereto. That is, in another exemplary embodiment, a functional pattern that performs an optical function may be provided on the upper surface US. The functional pattern may include a plurality of protruding patterns or recessed patterns.

The lower surface LS may be disposed to be opposite to the upper surface US. The lower surface LS may have substantially the same shape as the upper surface US and may be disposed in parallel with the upper surface US.

The lower surface LS may reflect or scatter light provided from the light source LS and serve to guide light to travel toward the upper surface US.

Although FIG. 1 illustrates a case in which the lower surface LS has a flat surface, the shape of the lower surface LS is not limited thereto. That is, according to another exemplary embodiment, a plurality of functional patterns may be provided on the lower surface LS. The functional pattern may be a pattern that performs a reflecting function and/or a scattering function as described above, and the shape and number of the functional patterns are not limited.

The side surface SS may be disposed between the upper surface US and the lower surface LS. According to an exemplary embodiment, the side surface SS may connect the upper surface US and the lower surface LS.

According to an exemplary embodiment, the light guide plate LG may include one or more side surfaces SS. In an exemplary embodiment, according to an exemplary embodiment in which the light guide plate LG has a rectangular parallelepiped shape as illustrated in FIG. 1, four side surfaces SS may be presented, for example. In this case, the side surfaces SS may include two short side surfaces opposing each other and two long side surfaces opposing each other.

According to an exemplary embodiment, the light source LS, which will be described below, may be disposed adjacent to a short side surface of the light guide plate LG. That is, according to an exemplary embodiment, the short side surface of the light guide plate LG adjacent to the light source may be a light incident surface, and the other short side surface opposing the light incident surface may be a light facing surface.

FIG. 1 illustrates a case in which the short side surfaces extend in a y-axis direction and the long side surfaces extend in an x-axis direction.

Although FIG. 1 illustrates a case in which the side surfaces SS include flat surfaces, the invention is not limited thereto. According to another exemplary embodiment, the side surfaces SS may at least partially include one or more inclined surfaces.

According to an exemplary embodiment, the light guide plate LG may be a glass light guide plate including a glass, for example.

The housing HO which accommodates the wavelength converting member Q may be disposed at one side of the light guide plate LG.

Light provided from the light source LS may pass through the wavelength converting member Q and be provided to the light guide plate LG. According to an exemplary embodiment, light that has passed through the wavelength converting member Q may be converted into white light, for example, and provided to the light guide plate LG. That is, the wavelength converting member Q may serve to shift a wavelength of provided light.

According to an exemplary embodiment, the wavelength converting member Q may include a quantum dot.

The quantum dot included in the wavelength converting member Q may include any one nanocrystal of a Si-based nanocrystal, a II-VI family compound semiconductor nanocrystal, a III-V family compound semiconductor nanocrystal, a IV-VI family compound semiconductor nanocrystal, and a combination thereof.

According to an exemplary embodiment, the II-VI family compound semiconductor nanocrystal may include at least one of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe and HgnSTe, for example.

According to an exemplary embodiment, the III-V family compound semiconductor nanocrystal may include at least one of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs, for example.

According to an exemplary embodiment, the IV-VI family compound semiconductor nanocrystal may be SbTe, for example. However, these are merely illustrative examples, and the types of a quantum dot material are not limited thereto. That is, any quantum dot material capable of performing a wavelength converting function may be used as the quantum dot included in the wavelength converting member Q.

According to an exemplary embodiment, the wavelength converting member Q may have a bar shape and extend in a longitudinal direction. FIG. 1 illustrates a case in which the wavelength converting member Q extends in the y-axis direction. In other words, the wavelength converting member Q may extend along the side surface SS of the light guide plate LG. According to an exemplary embodiment, the wavelength converting member Q may be disposed to face the light output surface, i.e., the side surface SS adjacent to the light source LS, of the short side surfaces of the light guide plate LG.

The wavelength converting member Q may continuously extend in one direction. However, the invention is not limited thereto, and according to another exemplary embodiment, the wavelength converting member Q may intermittently extend. That is, although FIG. 1 illustrates a case in which a single wavelength converting member Q is unitary, the invention is not limited thereto. According to another exemplary embodiment, a plurality of wavelength converting members Q may be provided independently of each other.

The wavelength converting member Q may be accommodated in the housing HO. For this, a storage space SP may be defined in the housing HO and the housing HO may have a bar shape extending in the longitudinal direction. According to an exemplary embodiment, the longitudinal direction may be the y-axis direction of FIG. 1.

A predetermined space may be defined in the housing HO. The predetermined space will be referred to as the storage space SP. The storage space SP may have one side open and the other side closed.

The storage space SP may be filled with the wavelength converting member Q. The wavelength converting member Q may be sealed by the housing HO and the flexible glass film GR, which will be described below. In other words, the storage space SP of the housing HO may be sealed by the flexible glass film GR, and accordingly, the wavelength converting member Q disposed in the storage space SP may be shielded from the outside and not exposed to moisture or air.

In an exemplary embodiment, the housing HO may be provided by including a glass, for example. In the exemplary embodiment, the housing HO may have the shape of a hollow glass tube, for example.

According to an exemplary embodiment, the housing HO may include the same type of glass as that of the light guide plate LG.

According to another exemplary embodiment, the housing HO may include a different type of glass from that of the light guide plate LG.

The flexible glass film GR which covers the housing HO may be disposed at one side of the housing HO.

The flexible glass film GR may include glass and have flexibility due to its thickness. According to an exemplary embodiment, the flexible glass film GR may have a thickness in the range of about 5 micrometers (μm) to about 50 μm along a z-direction in FIG. 1, for example.

According to an exemplary embodiment, the flexible glass film GR may cover one side of the housing HO, and accordingly, the storage space SP of the housing HO may be sealed. That is, the flexible glass film GR may directly contact the housing HO and the wavelength converting member Q and close an open portion of the storage space SP.

According to an exemplary embodiment, the housing HO may be disposed between the flexible glass film GR and the light guide plate LG. In this case, the open portion of the storage space SP of the housing HO may face an outer side of the light guide plate LG and be covered with the flexible glass film GR.

According to an exemplary embodiment, the closed portion of the housing HO may contact a side surface of the light guide plate LG. Here, the closed portion of the housing HO may contact the light guide plate LG but may not be welded thereto.

According to an exemplary embodiment, the flexible glass film GR may include a cover portion 101, a spaced-apart portion 102, and a contact portion 103.

The cover portion 101 of the flexible glass film GR may cover the storage space SP of the housing HO and seal the storage space SP. The cover portion 101 may be welded to the housing HO.

According to an exemplary embodiment, the cover portion 101 may be welded to the housing HO using a laser welding method, for example, and accordingly, a first laser welding part LB1 may be disposed at a contact surface between the cover portion 101 and the housing HO.

The first laser welding part LB1 will be described in detail with reference to FIG. 3.

Referring to FIG. 3, the first laser welding part LB1 may include a continuous welding line BL.

The welding line BL may be continuously provided, and a cross-sectional shape thereof may be a closed shape.

According to an exemplary embodiment in which a cross-sectional shape of the storage space SP is a quadrilateral shape, the welding line BL may have a quadrilateral shape disposed along an outer periphery of the cross-section of the storage space SP (refer to FIG. 3).

When the wavelength converting member Q includes a quantum dot, the function of the wavelength converting member Q may be considerably deteriorated when the wavelength converting member Q is exposed to moisture and oxygen.

When the flexible glass film GR and the housing HO are welded using a laser as described above, the storage space SP of the housing HO may be completely sealed, and the wavelength converting member Q may be prevented from being exposed to external moisture and oxygen.

Next, the first laser welding part LB1 will be described in detail with reference to FIG. 4.

FIG. 4 is an enlarged view of a part of the contact surface between the cover portion 101 of the flexible glass film GR and the housing HO.

Referring to FIG. 4, the first laser welding part LB1 may include a central region A1 and a periphery region A2 disposed outside the central region A1.

In this specification, the laser welding part may be provided using a femtosecond laser. The femtosecond laser may refer to a laser having a wavelength of femtoseconds.

The central region A1 of the first laser welding part LB1 may be provided across the contact surface.

According to an exemplary embodiment, a cross-section of the central region A1 may have an elliptical shape in which a long axis is longer than a short axis.

Hereinafter, although a case in which the central region A1 has an elliptical cross-section will be described as an example, the cross-sectional shape of the central region is not limited thereto. According to another exemplary embodiment, the central region A1 may have a circular cross-section. In this case, it is to be noted that the following description of the long axis may be replaced with description of a diameter of the circular shape.

Although FIG. 4 illustrates a case in which the long axis of the central region A1 is perpendicular to the contact surface, a direction of the long axis is not limited thereto. That is, the direction of the long-axis may vary depending on a laser irradiation direction.

A boundary between the housing HO and the cover portion 101 may disappear in the central region A1. That is, the contact surface between the housing HO and the cover portion 101 may not be clearly identified.

According to an exemplary embodiment, the housing HO may include a first glass material, and the flexible glass film GR may include a second glass material that is different from the first glass material.

According to an exemplary embodiment, the first glass material and the second glass material may have physical properties shown in Table 1 below.

TABLE 1

| Physical properties | First glass material | | Second glass material | |
| --- | --- | --- | --- | --- |
| | Candidate 1 | Candidate 2 | Candidate 1 | Candidate 2 |
| Heat expansion coefficient (CTE, ×10$^{-7}$/° C.) | 80 | 35 | 66 | 38 |
| Young's modulus (Gpa) | 68 | 83 | 77 | 73 |
| Refractive index | 1.49 | 1.53 | 1.51 | 1.52 |
| Softening point (° C.) | 830 | 1043 | 740 | 940 |
| Thickness | 0.5 mm to 1.5 mm | | 5 μm to 50 μm | |

When a difference in heat expansion coefficient is large between the housing HO and the flexible glass film GR, alignment between the housing HO and the flexible glass film GR may be distorted in a laser welding process. Consequently, it is advantageous as the difference in heat expansion coefficient between the housing HO and the flexible glass film GR is smaller.

Accordingly, according to an exemplary embodiment, the housing HO may include Candidate 1 of the first glass material, and the flexible glass film GR may include Candidate 1 of the second glass material.

According to another exemplary embodiment, the housing HO may include Candidate 2 of the first glass material, and the flexible glass film GR may include Candidate 2 of the second glass material.

According to an exemplary embodiment in which the housing HO includes the first glass material and the flexible glass film GR includes the second glass material, the central region A may be a region in which the first glass material and the second glass material are mixed without boundary.

According to an exemplary embodiment, the housing HO and the flexible glass film GR may include the same type of glass. In this case, the central region A1 may be a region in which the housing HO and the flexible glass film GR are mixed without boundary.

According to an exemplary embodiment, a width d1 of the long axis of the central region A1 may be in the range of about 10 μm to about 20 μm, for example.

The periphery region A2 may be disposed outside the central region A1 to surround the central region A1. According to an exemplary embodiment, the central region A1 may have a circular cross-section.

The housing HO and the flexible glass film GR included in the periphery region A2 may be at least partially melted. However, even in this case, the boundary between the housing HO and the flexible glass film GR is maintained, and the contact surface may be clearly identified. According to an exemplary embodiment, a width d2 of the periphery region A2 may be in the range of about 70 μm to about 100 μm, for example.

When the size of the first laser welding part LB1 is large, thermal damage may be applied to the wavelength converting member Q. When a maximum width of a welding dot BD is in the range of about 70 μm to about 100 μm as described above, for example, thermal damage applied to the wavelength converting member Q may be prevented or minimized.

A laser having a wavelength of femtoseconds may be used to minimize the size of the first laser welding part LB1. When the femtosecond laser is used, the housing HO and the flexible glass film GR are welded to each other, and the maximum width of the first laser welding LB1 may be maintained to be about 100 μm or smaller, for example. Accordingly, damage to the wavelength converting member Q due to heat may be minimized.

Referring again to FIG. 1, the spaced-apart portion 102 may extend from the cover portion 101 toward an inside of the light guide plate LG. That is, the spaced-apart portion 102 may overlap the upper surface US and/or the lower surface LS of the light guide plate LG.

Although the flexible glass film GR has flexibility, the flexible glass film GR may be broken when curved by a predetermined angle or more because the flexible glass film GR basically includes a fragile material. Accordingly, the spaced-apart portion 102 may be gently curved with a predetermined curvature.

As the spaced-apart portion 102 is bent with a gentle curve, the spaced-apart portion 102 may be provided to be spaced apart from the upper surface US of the light guide plate LG by a predetermined distance.

The contact portion 103 may extend from the spaced-apart portion 102 toward the inside of the light guide plate LG.

According to an exemplary embodiment, the contact portion 103 may directly contact the upper surface US of the light guide plate LG.

According to an exemplary embodiment, the contact portion 103 may be welded to the upper surface US of the light guide plate LG using a laser welding method. Accordingly, a second laser welding part LB2 may be disposed at a contact surface between the contact portion 103 and the upper surface of the light guide plate LG.

According to an exemplary embodiment, the second laser welding part LB2 may include a plurality of welding dots BD. Cross-sections of the welding dots BD may be substantially the same as that described with reference to FIG. 4. That is, as described with reference to FIG. 4, each of the welding dots BD may be provided using a femtosecond laser, and accordingly, each of the welding dots BD may include the central region A1 and the periphery region A2.

According to an exemplary embodiment, the plurality of welding dots BD may be disposed on the same axis. FIG. 1 illustrates a case in which the plurality of welding dots BD extends in the y-axis direction, for example.

Although FIG. 1 illustrates a case in which the second laser welding part LB2 intermittently extends, the invention is not limited thereto. According to another exemplary embodiment, like the first laser welding part LB1, the second laser welding part LB2 may include the continuous welding line BL.

The backlight unit according to an exemplary embodiment may further include the light source LS disposed at one side of the housing HO. The light source LS may provide light to the light guide plate LG. According to an exemplary embodiment, the light source LS may be disposed adjacent to the side surface of the light guide plate LG.

Specifically, the wavelength converting member Q may be disposed between the light source LS and the light guide plate LG.

According to an exemplary embodiment, the light source LS may include a printed circuit board ("PCB") 55 and a light emitting diode ("LED") 56. The PCB 55 may support the LED 56. According to an exemplary embodiment, the PCB 55 may extend in the longitudinal direction. According to an exemplary embodiment, the PCB 55 may extend in the same direction as the wavelength converting member Q, i.e., the y-axis direction in FIG. 2. That is, the PCB 55 and the wavelength converting member Q may extend in parallel to each other.

The PCB 55 may include various circuits (not illustrated) which control the LED 56.

The LED 56 may be disposed on the PCB 55. In an exemplary embodiment, the LED 56 may be an LED which emits blue light or an LED which emits ultraviolet ("UV") light, for example. However, these are merely illustrative, and the types of the LED 56 are not limited thereto.

A plurality of LEDs 56 may be disposed along the PCB 55. As described above, light emitted from the LEDs 56 may be provided across one of the side surfaces SS, i.e., the light incident surface, of the light guide plate LG via the wavelength converting member Q.

Next, a backlight unit according to another exemplary embodiment of the invention will be described.

In the exemplary embodiment below, the same elements as those described above will be denoted with like reference numerals, and overlapping description will be omitted or simplified.

Figure 5:
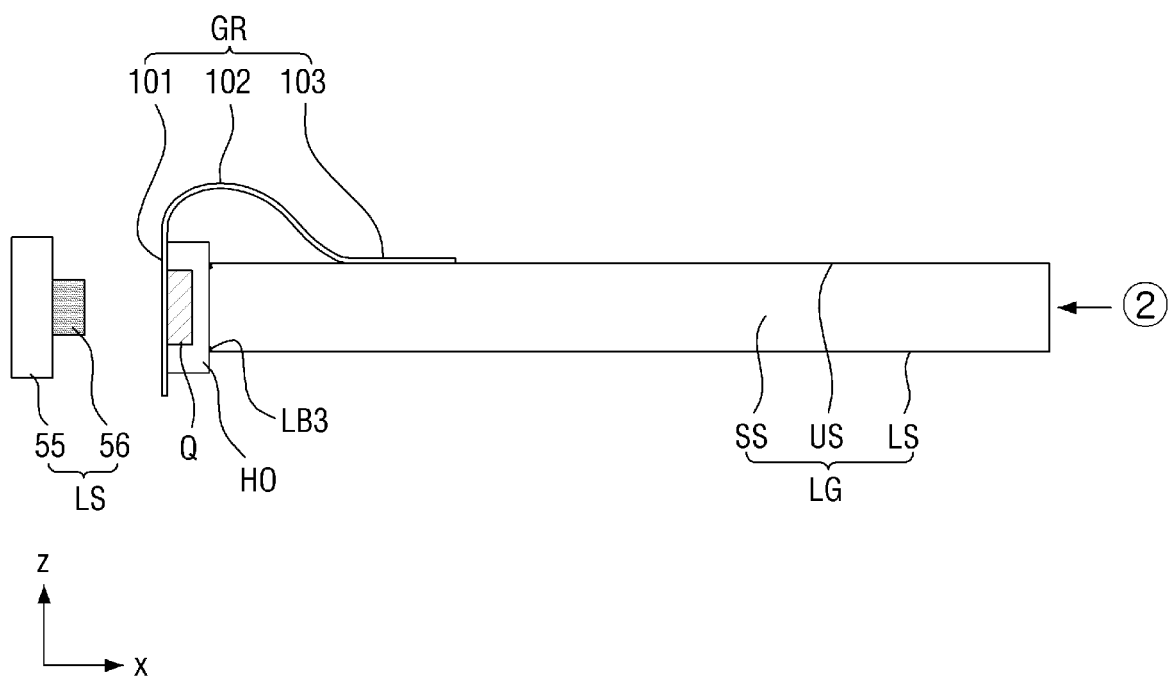
FIG. 5 is a cross-sectional view of another exemplary embodiment of a backlight unit according to the invention.

FIG. 5 is a cross-sectional view of a backlight unit according to another exemplary embodiment of the invention.

Figure 6:
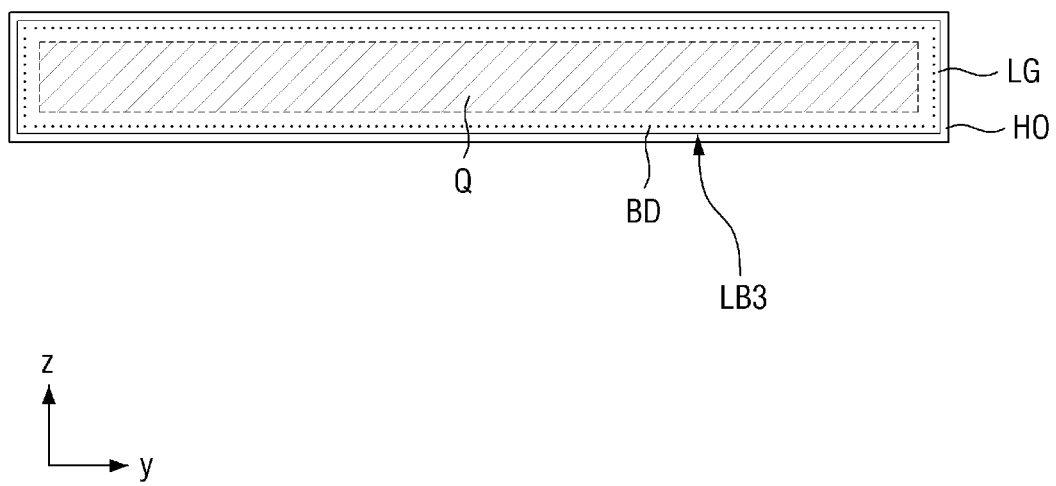
FIG. 6 is a side view of the backlight unit according to the exemplary embodiment of FIG. 5.

FIG. 6 is a side view of the backlight unit according to the exemplary embodiment of FIG. 5.

Referring to FIG. 5, according to an exemplary embodiment, one surface of the housing HO may be welded to the light guide plate LG.

Accordingly, a third laser welding part LB3 may be disposed between the housing HO and the light guide plate LG.

The third laser welding part LB3 may be provided at a contact surface between the side surface SS of the light guide plate LG and the housing HO.

According to an exemplary embodiment, the third laser welding part LB3 may include the plurality of welding dots BD (refer to FIG. 6). The cross-sections of the welding dots BD may be substantially the same as that described with reference to FIG. 4. That is, as described with reference to FIG. 4, each of the welding dots BD may be provided using a femtosecond laser, and accordingly, each of the welding dots BD may include the central region A1 and the periphery region A2.

According to an exemplary embodiment, the welding dots BD may be disposed to surround an outer periphery of the wavelength converting member Q. That is, the welding dots BD and the wavelength converting member Q may not overlap each other in the x-axis direction. The welding dots BD may cause optical loss due to their physical structures, and when the welding dots BD and the wavelength converting member Q do not overlap each other in the x-axis direction as described above, light that has passed through the wavelength converting member Q may be immediately provided to the light guide plate LG without contacting the welding dots BD.

Although FIG. 6 illustrates a case in which the plurality of welding dots BD form a quadrilateral shape, the shape provided by the welding dots BD is not limited thereto.

According to an exemplary embodiment, the welding dots BD may be disposed along any one or more line segments selected from four sides of a rectangle.

Although FIG. 6 illustrates a case in which the third laser welding part LB3 intermittently extend, the invention is not limited thereto. According to another exemplary embodiment, like the first laser welding part LB1, the third laser welding part LB3 may include the continuous welding line BL (refer to FIG. 3).

Figure 7:
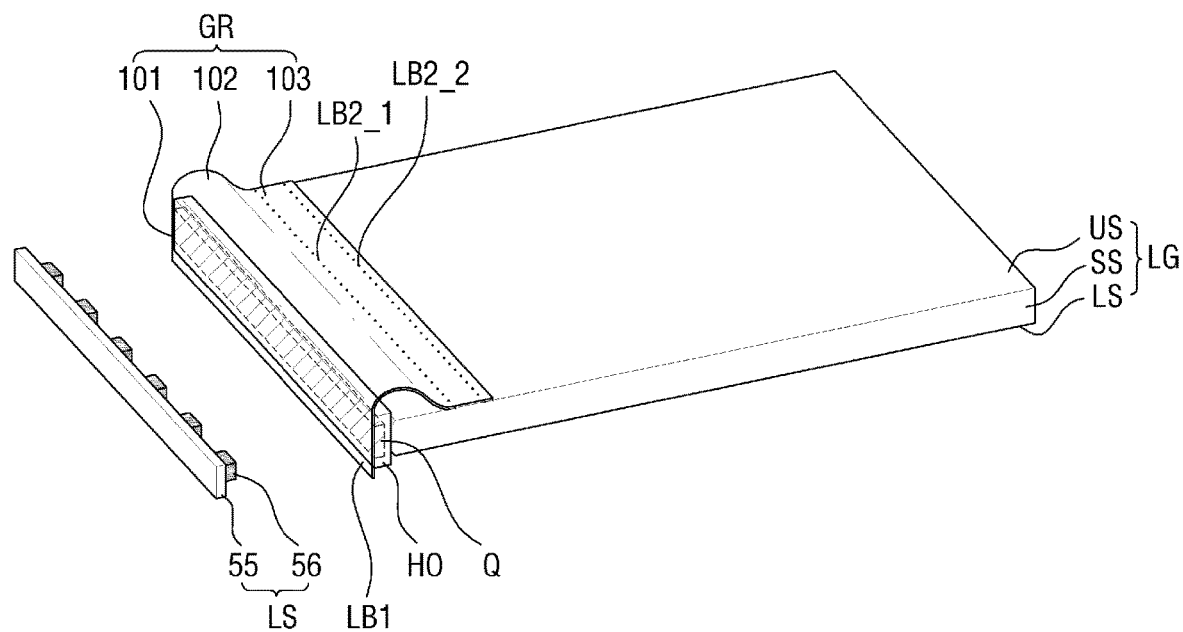
FIG. 7 is a perspective view of another exemplary embodiment of a backlight unit according to the invention.

FIG. 7 is a perspective view of a backlight unit according to another exemplary embodiment of the invention. Referring to FIG. 7, according to an exemplary embodiment, a second laser welding part first line LB2_1 and a second laser welding part second line LB2_2 may be disposed at the contact portion 103 of the flexible glass film GR and the upper surface US of the light guide plate LG.

According to an exemplary embodiment, the second laser welding part LB2 may include a plurality of lines.

According to an exemplary embodiment, the second laser welding part first line LB2_1 and the second laser welding part second line LB2_2 may extend in parallel to each other in the y-axis direction.

According to an exemplary embodiment, the second laser welding part first line LB2_1 and the second laser welding part second line LB2_2 may include the plurality of welding dots BD (refer to FIGS. 1 and 6). That is, the plurality of welding dots BD may be disposed along the second laser welding part first line LB2_1 and the second laser welding part second line LB2_2.

According to an exemplary embodiment, each of the second laser welding part first line LB2_1 and the second laser welding part second line LB2_2 may include the continuous welding line BL.

The welding dots BD and the welding line BL may be substantially the same as those described above with reference to the backlight unit according to some exemplary embodiments of the invention.

When the second laser welding part LB2 includes the plurality of lines, a welding force between the flexible glass film GR and the light guide plate LG may be strengthened, and accordingly, the flexible glass film GR and the light guide plate LG may be stably fixed to each other.

Figure 8:
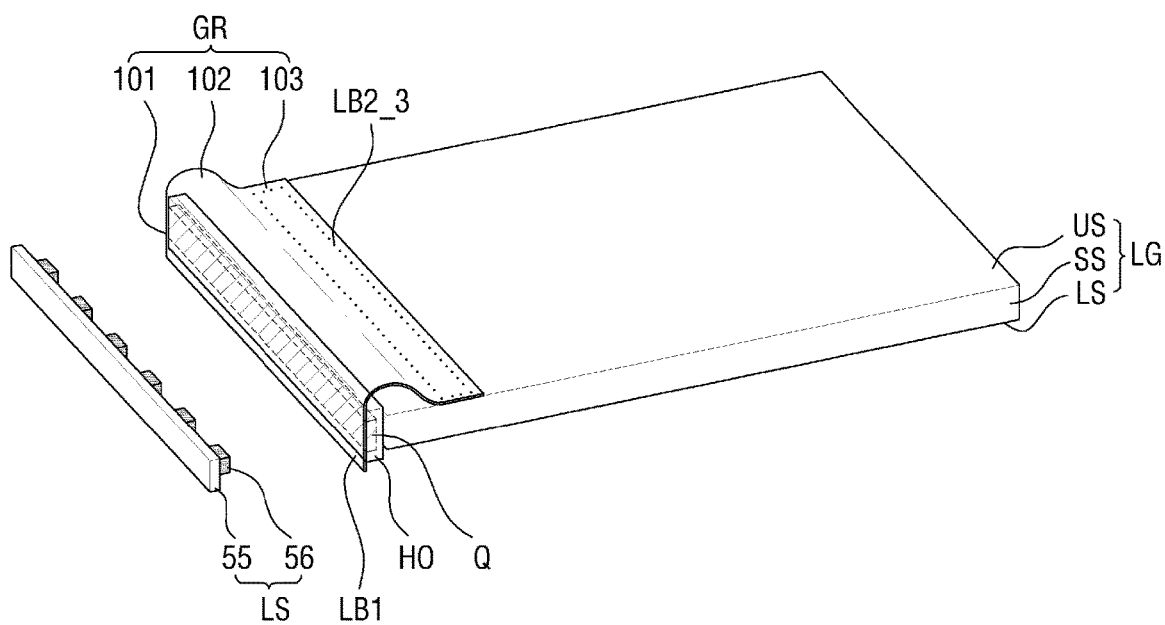
FIG. 8 is a perspective view of another exemplary embodiment of a backlight unit according to the invention.

FIG. 8 is a perspective view of a backlight unit according to another exemplary embodiment of the invention. Referring to FIG. 8, according to an exemplary embodiment, a second laser welding part LB2_3 may have a closed shape.

According to an exemplary embodiment, a cross-sectional shape of the second laser welding part LB2_3 may be a closed shape.

The second laser welding part LB2_3 may draw a closed curve along an outer periphery of the contact surface between the contact portion 103 of the flexible glass film GR and the upper surface US of the light guide plate LG. FIG. 8 illustrates a case in which the cross-sectional shape of the second laser welding part LB2_3 is a quadrilateral shape.

The second laser welding part LB2_3 may include the intermittent welding dots BD (refer to FIGS. 1 and 6) or the continuous welding line BL (refer to FIG. 3).

When drawing the closed curve along the outer periphery of the contact surface between the contact portion 103 of the flexible glass film GR and the upper surface US of the light guide plate LG, the second laser welding part LB2_3 may minimize optical interference due to the laser welding part while increasing the welding strength between the flexible glass film GR and the light guide plate LG. That is, an overlap between the laser welding part and an optical path of light passing through the light guide plate may be minimized.

Figure 9:
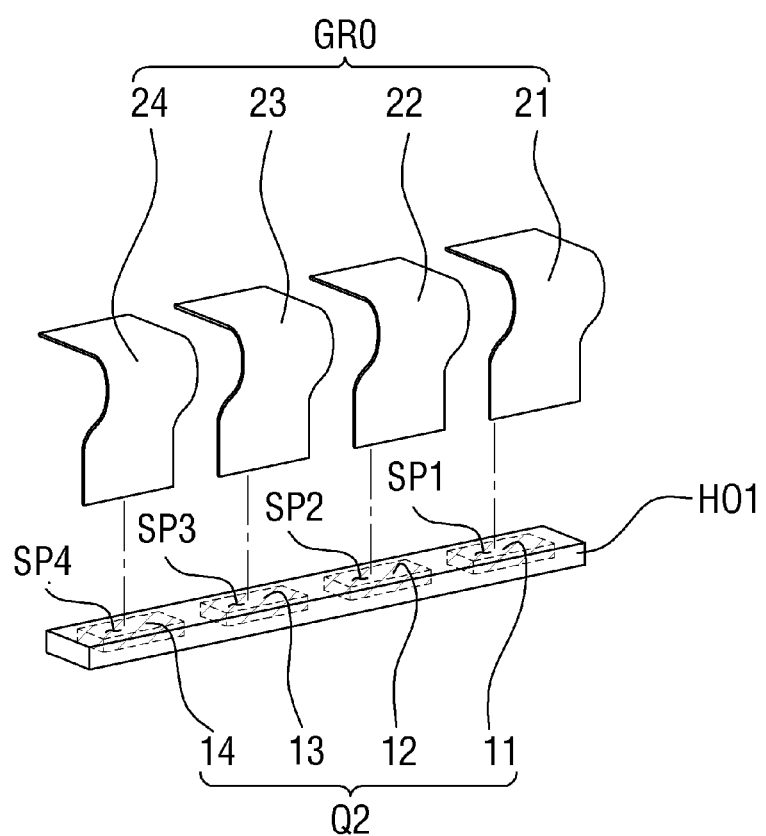
FIG. 9 is a perspective view of another exemplary embodiment of a part of a backlight unit according to the invention.

FIG. 9 is a perspective view of a part of a backlight unit according to another exemplary embodiment of the invention.

Figure 10:
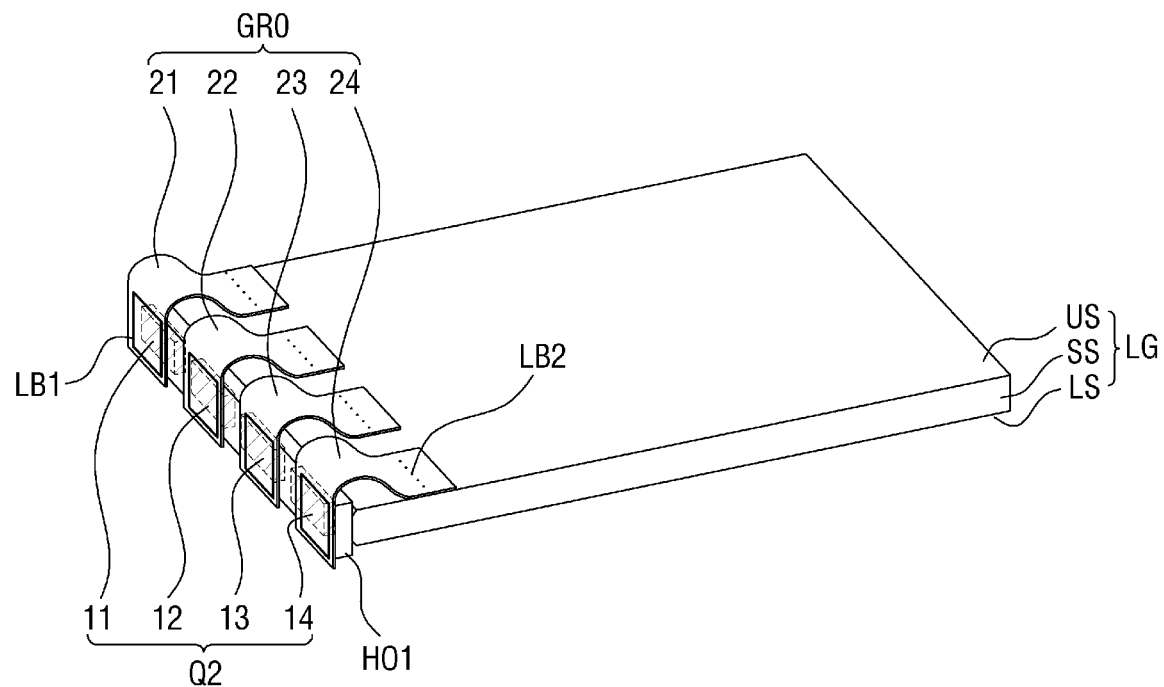
FIG. 10 is a perspective view of the backlight unit to which the exemplary embodiment of FIG. 9 is applied.

FIG. 10 is a perspective view of the backlight unit to which the exemplary embodiment of FIG. 9 is applied.

Referring to FIGS. 9 and 10, according to an exemplary embodiment, a flexible glass film GR0 may include a plurality of sub-flexible glass films 21, 22, 23, and 24.

According to an exemplary embodiment, the flexible glass film GR0 may include a first sub-flexible glass film 21, a second sub-flexible glass film 22, a third sub-flexible glass film 23, and a fourth sub-flexible glass film 24.

Although FIG. 9 illustrates a case in which the flexible glass film GR0 includes the four sub-flexible glass films, this is merely illustrative, and the number of sub-flexible glass films is not limited thereto. According to another exemplary embodiment, the number of sub-flexible glass films may be less than or greater than four.

A wavelength converting member Q2 may include a plurality of sub-wavelength converting members 11, 12, 13, and 14 to correspond to the plurality of sub-flexible glass films.

According to an exemplary embodiment, the wavelength converting member Q2 may include a first sub-wavelength converting member 11, a second sub-wavelength converting member 12, a third sub-wavelength converting member 13, and a fourth sub-wavelength converting member 14.

According to an exemplary embodiment, a housing HO1 may include four storage spaces SP1, SP2, SP3, and SP4 separated from each other. For convenience of description, the four storage spaces SP1, SP2, SP3, and SP4 will be referred to as a first storage space SP1, a second storage space SP2, a third storage space SP3, and a fourth storage space SP4.

The first storage space SP1, the second storage space SP2, the third storage space SP3, and the fourth storage space SP4 may be filled with the first sub-wavelength converting member 11, the second sub-wavelength converting member 12, the third sub-wavelength converting member 13, and the fourth sub-wavelength converting member 14, respectively.

In addition, the first sub-flexible glass film 21, the second sub-flexible glass film 22, the third sub-flexible glass film 23, and the fourth sub-flexible glass film 24 may cover the first storage space SP1, the second storage space SP2, the third storage space SP3, and the fourth storage space SP4, respectively. Accordingly, the first sub-wavelength converting member 11, the second sub-wavelength converting member 12, the third sub-wavelength converting member 13, and the fourth sub-wavelength converting member 14 may be sealed.

Each of the first sub-flexible glass film 21, the second sub-flexible glass film 22, the third sub-flexible glass film 23, and the fourth sub-flexible glass film 24 may include a cover portion, a spaced-apart portion, and a contact portion. The cover portion, the spaced-apart portion, and the contact portion of each of the first sub-flexible glass film 21, the second sub-flexible glass film 22, and the third sub-flexible glass film 23 may be substantially the same as those described above with reference to the flexible glass film GR according to the exemplary embodiment of FIG. 1.

That is, the first laser welding part LB1 may be generated between the housing HO1 and each of the first sub-flexible glass film 21, the second sub-flexible glass film 22, and the third sub-flexible glass film 23. The first laser welding part LB1 may include the continuous welding line BL (refer to FIG. 3), and the welding line BL may be provided along outer peripheries of the first storage space SP1, the second storage space SP2, the third storage space SP3, and the fourth storage space SP4.

Each of the first sub-flexible glass film 21, the second sub-flexible glass film 22, and the third sub-flexible glass film 23 may include the spaced-apart portion overlapping the light guide plate LG while being spaced a predetermined distance apart therefrom.

In addition, each of the first sub-flexible glass film 21, the second sub-flexible glass film 22, the third sub-flexible glass film 23, and the fourth sub-flexible glass film 24 may include the contact portion contacting the light guide plate LG.

Accordingly, the second laser welding part LB2 may be disposed between the upper surface US of the light guide plate LG and each of the first sub-flexible glass film 21, the second sub-flexible glass film 22, the third sub-flexible glass film 23, and the fourth sub-flexible glass film 24.

The second laser welding part LB2 may include the intermittent welding dots BD (refer to FIGS. 1 and 6) or the continuous welding line BL (refer to FIG. 3).

Figure 11:
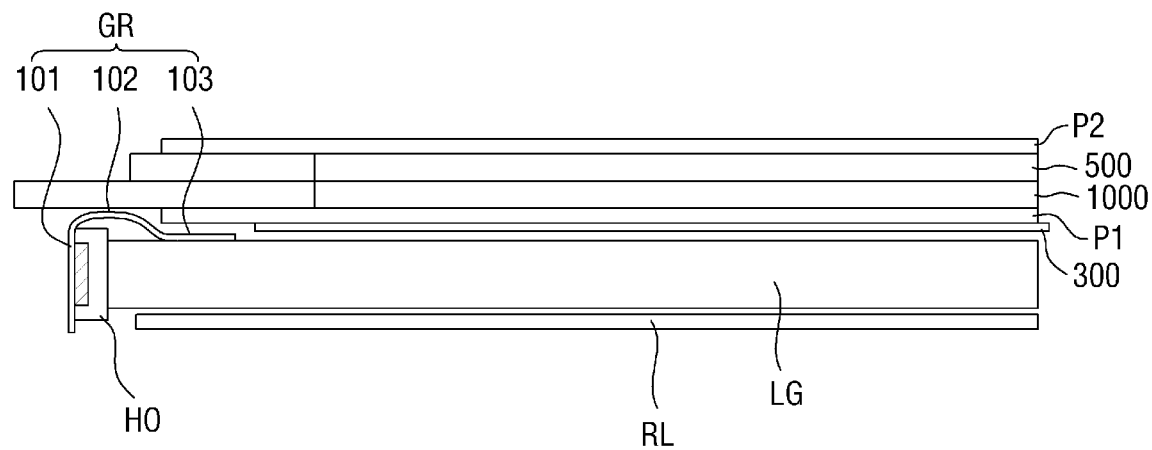
FIG. 11 is a cross-sectional view of an exemplary embodiment of a display device according to the invention.

Next, a display device according to an exemplary embodiment of the invention will be described. FIG. 11 is a cross-sectional view of a display device according to an exemplary embodiment of the invention. Referring to FIG. 11, the display device according to an exemplary embodiment of the invention includes a backlight unit and a display panel disposed on the backlight unit.

The backlight unit may be substantially equal to the backlight unit according to some exemplary embodiments of the invention described above. Consequently, detailed description thereof will be omitted.

According to an exemplary embodiment, the display panel may include a first substrate 1000, a second substrate 500 facing the first substrate 1000, and a liquid crystal layer (not illustrated) disposed between the first substrate 1000 and the second substrate.

According to an exemplary embodiment, the first substrate 1000 may be an array substrate on which a plurality of transistors is disposed, and the second substrate 500 may be a color filter substrate on which a color filter is disposed.

According to another exemplary embodiment, a color filter may be disposed on the first substrate 1000. That is, the display panel may be a display panel having a color filter-on-array ("COA") structure, for example.

According to an exemplary embodiment, the first substrate 1000 and/or the second substrate 500 may include glass.

According to an exemplary embodiment, at least a portion of the first substrate 1000 may overlap the second substrate 500. In this case, a driver (not illustrated), a PCB (not illustrated), and the like may be disposed at a region on the first substrate 1000 not overlapping the second substrate 500.

According to an exemplary embodiment, the first substrate 1000 may have a wider area than the second substrate 500. However, the invention is not limited thereto, and according to another exemplary embodiment, the second substrate 500 may have a wider area than the first substrate 1000.

According to an exemplary embodiment, the display device according to an exemplary embodiment of the invention may further include a first polarizing plate P1, a second polarizing plate P2, an optical sheet 300, and a reflective layer RL.

According to an exemplary embodiment, the first polarizing plate P1 and the second polarizing plate P2 may be disposed at an outside of the display panel.

Only light vibrating in a specific direction of provided light may pass through the first polarizing plate P1 and the second polarizing plate P2, and remaining light may be shielded or reflected by the first polarizing plate P1 and the second polarizing plate P2.

According to an exemplary embodiment, polarizing directions of the first polarizing plate P1 and the second polarizing plate P2 may be different from each other.

According to an exemplary embodiment, unlike those illustrated in FIG. 11, the first polarizing plate P1 and the second polarizing plate P2 may be disposed inside the display panel. In this case, the first polarizing plate P1 and the second polarizing plate P2 may be in-cell polarizing plates.

According to an exemplary embodiment, the first polarizing plate P1 and/or the second polarizing plate P2 may include a wire-grid polarizer ("WGP"), for example.

According to an exemplary embodiment, the reflective layer RL may be disposed below the light guide plate LG. The reflective layer RL may serve to reflect light that has passed through the lower surface LS of the light guide plate LG toward the upper surface US again. The reflective layer RL may perform specular reflection and/or diffuse reflection.

According to an exemplary embodiment, the reflective layer RL may be provided in a sheet shape. Also, a plurality of functional patterns may be provided on the reflective layer RL.

According to an exemplary embodiment, the optical sheet 300 may be disposed above the light guide plate LG. According to an exemplary embodiment, a single optical sheet 300 may be present, and the optical sheet 300 may perform complex functions such as scattering and diffusing.

According to another exemplary embodiment, a plurality of optical sheets 300 may be present, and the optical sheets 300 may perform functions independent of each other.

Figure 12:
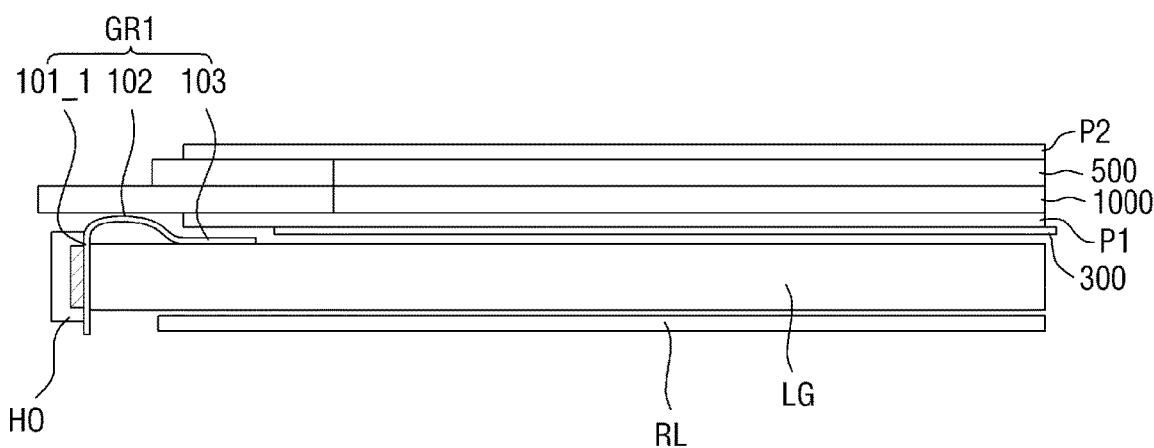
FIG. 12 is a cross-sectional view of another exemplary embodiment of a display device according to the invention.

FIG. 12 is a cross-sectional view of a display device according to another exemplary embodiment of the invention.

Referring to FIG. 12, in the display device according to an exemplary embodiment, a cover portion 101_1 of a flexible glass film GR1 may be disposed between the housing HO and the light guide plate LG.

The fact that the cover portion 101_1 and the housing HO are welded using a laser is that same as in the backlight unit according to some exemplary embodiments of the invention described above. However, unlike the exemplary embodiments described above, the cover portion 101_1 may directly contact the light guide plate LG in this exemplary embodiment.

According to an exemplary embodiment, the cover portion 101_1 and the light guide plate LG may contact each other but not be welded to each other.

According to another exemplary embodiment, the cover portion 101_1 and the light guide plate LG may be welded to each other using a laser. In this case, the third laser welding part may be disposed between the cover portion 101_1 and the light guide plate LG.

Figure 13:
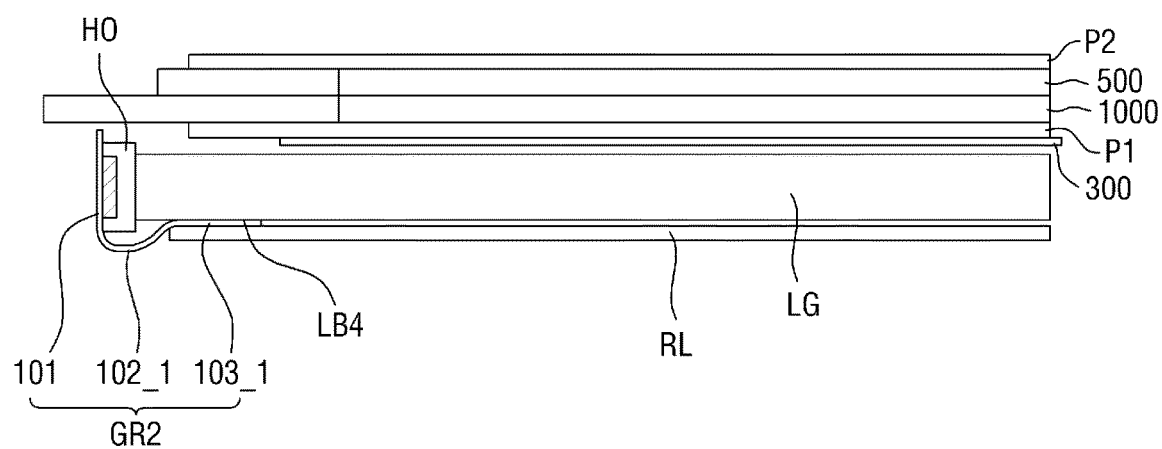
FIG. 13 is a cross-sectional view of another exemplary embodiment of a display device according to the invention.

FIG. 13 is a cross-sectional view of a display device according to another exemplary embodiment of the invention. Referring to FIG. 13, according to an exemplary embodiment, a flexible glass film GR2 may contact the lower surface LS of the light guide plate LG.

That is, the flexible glass film GR2 may extend toward the lower surface LS of the light guide plate LG, and accordingly, a spaced-apart portion 102_1 may face the lower surface LS of the light guide plate LG, and a contact portion 103_1 may contact the lower surface LS of the light guide plate LG. According to an exemplary embodiment, the contact portion 103_1 and the lower surface LS of the light guide plate LG may be welded using a laser. Accordingly, the fourth laser welding part LB4 may be disposed between the contact portion 103_1 and the lower surface LS.

Figure 14:
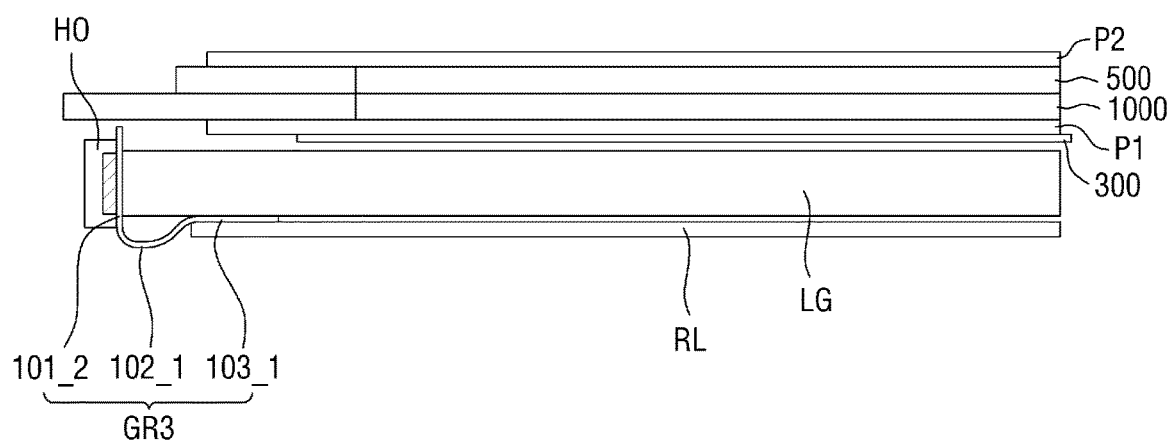
FIG. 14 is a cross-sectional view of another exemplary embodiment of a display device according to the invention.

FIG. 14 is a cross-sectional view of a display device according to another exemplary embodiment of the invention.

Referring to FIG. 14, the display device according to the other embodiment of the invention is different from the exemplary embodiment of FIG. 1 in that a cover portion 101_2 of a flexible glass film GR3 is disposed between the housing HO and the light guide plate LG and the contact portion 103_1 contacts the lower surface of the light guide plate LG.

The fact that the cover portion 101_2 is disposed between the housing HO and the light guide plate LG may be substantially the same as that described above with reference to FIG. 12. Also, the fact that the contact portion 103_1 contacts the lower surface LS of the light guide plate LG may be substantially the same as that described above with reference to FIG. 13. Consequently, detailed description thereof will be omitted.

Figure 15:
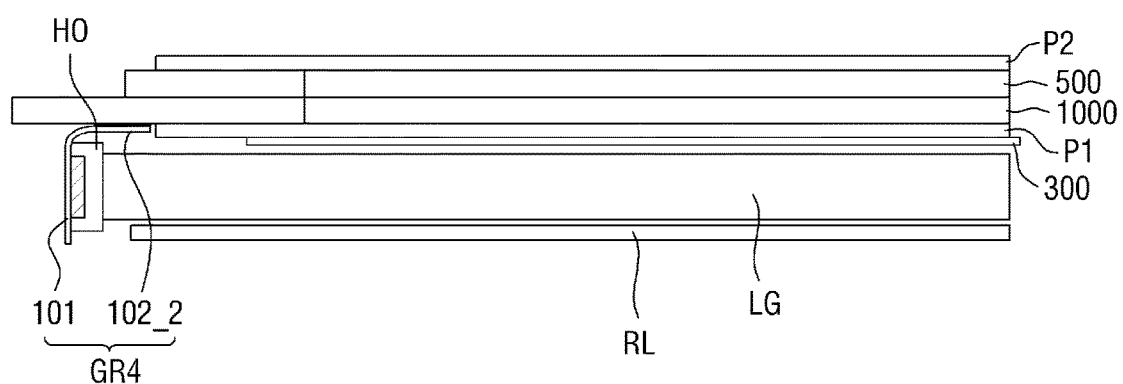
FIG. 15 is a cross-sectional view of another exemplary embodiment of a display device according to the invention.

FIG. 15 is a cross-sectional view of a display device according to another exemplary embodiment of the invention. Referring to FIG. 15, a flexible glass film GR4 may include the cover portion 101 and a panel contact portion 102_2.

The cover portion 101 may be substantially the same as that described above according to some exemplary embodiments of the invention. Consequently, detailed description thereof will be omitted.

The panel contact portion 102_2 may contact a lower surface of the first substrate 1000.

According to an exemplary embodiment, the panel contact portion 102_2 may contact the lower surface of the first substrate 1000 but not be welded thereto.

According to another exemplary embodiment, the panel contact portion 102_2 may be welded to the first substrate 1000.

According to an exemplary embodiment, the first substrate 1000 may include glass. In this case, the first substrate 1000 and the panel contact portion 102_2 may be welded using a laser. That is, a fourth laser welding part (not illustrated) may be disposed between the first substrate 1000 and the panel contact portion 102_2.

Figure 16:
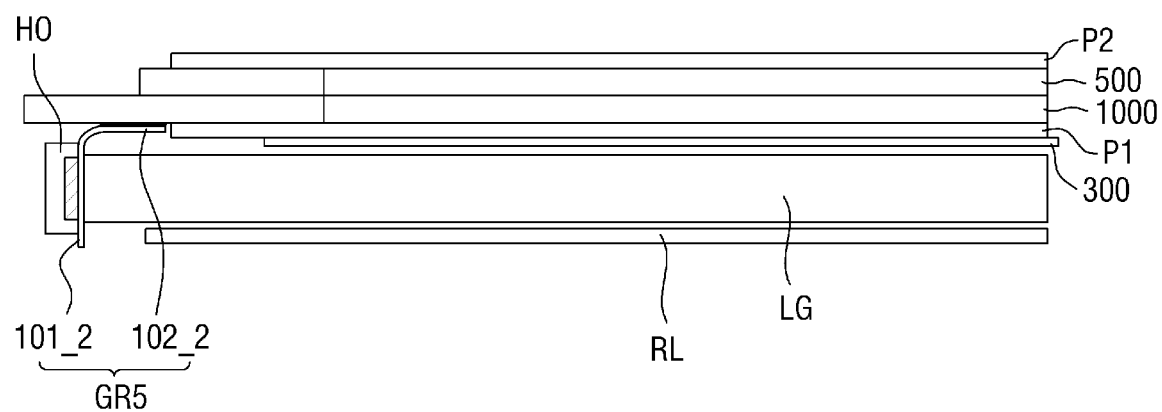
FIG. 16 is a cross-sectional view of another exemplary embodiment of a display device according to the invention.

FIG. 16 is a cross-sectional view of a display device according to another exemplary embodiment of the invention. Referring to FIG. 16, according to an exemplary embodiment, a flexible glass film GR5 includes the cover portion 101_2 and the panel contact portion 102_2, and the cover portion 101_2 may be disposed between the light guide plate LG and the housing HO.

The case in which the cover portion 101_2 is disposed between the light guide plate LG and the housing HO may be substantially the same as that described above with reference to FIG. 14. Consequently, detailed description thereof will be omitted.

When the structures according to the exemplary embodiments of FIGS. 11 to 16 are adopted, the wavelength converting member Q may be reliably fixed while deterioration of optical characteristics in the display device is minimized.

Figure 17:
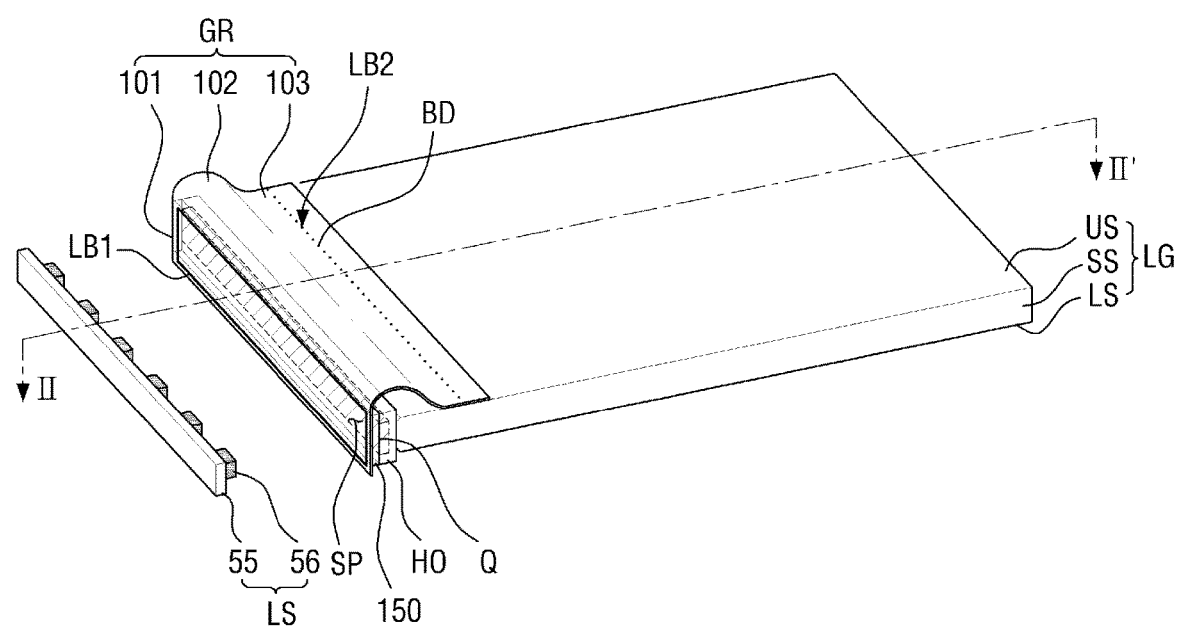
FIG. 17 is a perspective view of an exemplary embodiment of a backlight unit according to the invention.
Figure 18:
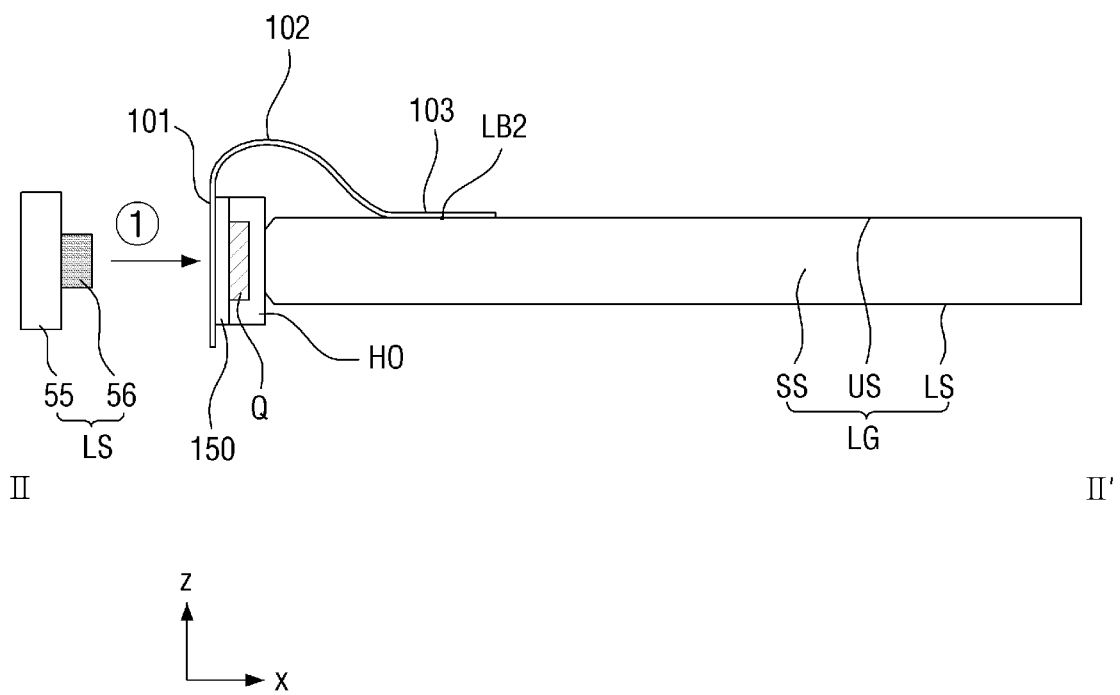
FIG. 18 is a cross-sectional view taken along line II-IF of FIG. 17.

FIG. 17 is a perspective view of a backlight unit according to an exemplary embodiment of the invention. FIG. 18 is a cross-sectional view taken along line II-II' of FIG. 17

Referring to FIGS. 17 and 18, according to an exemplary embodiment, the backlight unit may further include a cover glass 150 which seals the housing HO.

The cover glass 150 may be disposed at one side of the housing HO. According to an exemplary embodiment, the cover glass 150 may be disposed between the flexible glass film GR and the housing HO. In other words, one side of the cover glass 150 may contact the flexible glass film GR, and the other side thereof may contact the housing HO.

According to an exemplary embodiment, the cover glass 150 may include a glass material.

According to an exemplary embodiment, the cover glass 150 may seal an inner space of the housing HO. That is, by closing an open portion of the housing HO, the cover glass 150 may seal the wavelength converting member Q disposed in the inner space of the housing HO.

For this, the cover glass 150 and the housing HO may be welded using a laser. That is, a fifth laser welding part may be disposed between the cover glass 150 and the housing HO. Although not illustrated in the drawings, the fifth laser welding part may have a shape and structure that are substantially the same as those of the first laser welding part LB1 described above with reference to FIGS. 1 to 3.

According to an exemplary embodiment, the cover glass 150 and the flexible glass film GR may be welded using a laser. That is, a sixth laser welding part may be disposed between the cover glass 150 and the flexible glass film GR. The sixth laser welding part may include the welding dots BD (refer to FIGS. 1 and 6) and/or the welding line BL (refer to FIG. 3).

Although FIGS. 17 and 18 illustrate a configuration in which the cover glass 150 and the housing HO are disposed independent of each other, the invention is not limited thereto. According to another exemplary embodiment, the cover glass 150 and the housing HO may be unitary. In other words, the housing HO may include the cover glass 150, and accordingly, the housing HO itself may seal the wavelength converting member Q.

Hereinafter, a method of manufacturing a display device according to some exemplary embodiments of the invention will be described. Some of the elements that will be described below may be the same as those of the liquid crystal display ("LCD") device according to some exemplary embodiments of the invention described above, and description thereof may be omitted to avoid overlapping description.

The method of manufacturing a display device according to an exemplary embodiment of the invention includes preparing the light guide plate LG and the housing HO which is disposed at one side of the light guide plate LG and accommodates the wavelength converting member Q, and placing the flexible glass film GR at one side of the housing HO and welding the housing HO and the flexible glass film GR using a femtosecond laser.

The light guide plate LG and the wavelength converting member Q may be the same as those described above with reference to some exemplary embodiments of the invention.

The placing of the flexible glass film GR at the side of the housing HO and the welding of the housing HO and the flexible glass film GR using the femtosecond laser may include irradiating the contact surface between the flexible glass film GR and the housing HO with the femtosecond laser, for example. When the contact surface between the flexible glass film GR and the housing HO is irradiated with the femtosecond laser, the first laser welding part LB1 may be disposed between the flexible glass film GR and the housing HO (refer to FIG. 1). Also, as described above, the first laser welding part LB1 may include the welding line BL.

The welding line BL may be provided using a method of continuously irradiating the femtosecond laser. That is, when the laser is continuously irradiated while moving a focus of the femtosecond laser, the continuous welding line BL may be provided.

The fact that the cross-section of the welding line BL may include the central region A1 and the periphery region A2 is the same as that described above with reference to FIG. 4.

According to an exemplary embodiment of the invention, the method of manufacturing a display device may further include welding the flexible glass film GR and the light guide plate LG using a femtosecond laser.

As described above, the flexible glass film GR may include the cover portion 101, the spaced-apart portion 102, and the contact portion 103. The contact portion 103 may contact the upper surface US or the lower surface LS of the light guide plate LG.

Then, a portion between the flexible glass film GR and the light guide plate LG may be irradiated with the femtosecond laser. When the portion between the flexible glass film GR and the light guide plate LG is irradiated with the femtosecond laser, the second laser welding part LB2 may be disposed between the flexible glass film GR and the light guide plate LG.

As described above, the second laser welding part LB2 may include the welding dots BD and/or the welding line BL.

The welding dots BD may be provided using a method of intermittently irradiating the femtosecond laser. That is, when the laser is intermittently irradiated while moving the focus of the femtosecond laser, the plurality of welding dots BD may be provided.

The welding line BL may be provided using a method of continuously irradiating the femtosecond laser. That is, when the laser is continuously irradiated while moving the focus of the femtosecond laser, the continuous welding line BL may be provided.

The fact that the cross-section of the welding line BL may include the central region A1 and the periphery region A2 is the same as that described above with reference to FIG. 4.

According to an exemplary embodiment of the invention, the method of manufacturing a display device may further include welding the housing HO and the light guide plate LG by irradiating a portion therebetween with the femtosecond laser, for example. As described above with reference to FIG. 5, the third laser welding part LB3 may be disposed between the housing HO and the light guide plate LG.

The fact that the third laser welding part LB3 may include the welding line BL and/or the welding dots BD is the same as that described above according to some exemplary embodiments of the invention.

As a result, according to the exemplary embodiments of the invention, there are at least the following advantageous effects.

That is, alignment between a light guide plate and a wavelength converting member can be accurately maintained.

Also, a housing which accommodates the light guide plate and the wavelength converting member can be reliably fixed.

The advantageous effects according to the exemplary embodiments of the invention are not limited to those mentioned above, and various other advantageous effects are included herein.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A backlight unit comprising:
    a light guide plate;
    a housing which is disposed at one side of the light guide plate and accommodates a wavelength converting member; and
    a flexible glass film which covers one side of the housing, wherein a first laser welding part is disposed between the flexible glass film and the housing.

2. The backlight unit of claim 1, wherein the flexible glass film includes:
    a cover portion which covers the one side of the housing;
    a spaced-apart portion overlapping the light guide plate and spaced apart from the light guide plate; and
    a contact portion contacting the light guide plate.

3. The backlight unit of claim 2, wherein the spaced-apart portion is curved with a predetermined curvature.

4. The backlight unit of claim 2, wherein a second laser welding part is disposed between the light guide plate and the contact portion.

5. The backlight unit of claim 4, wherein the second laser welding part includes a plurality of welding dots.

6. The backlight unit of claim 4, wherein the second laser welding part includes a first line and a second line which extend in parallel to each other and include a plurality of welding dots or a welding line.

7. The backlight unit of claim 1, wherein a thickness of the flexible glass film is in a range of about 5 micrometers to about 50 micrometers.

8. The backlight unit of claim 1, wherein the first laser welding part includes a continuous welding line.

9. The backlight unit of claim 1, wherein a second laser welding part is disposed between the light guide plate and the housing.

10. The backlight unit of claim 1, wherein the wavelength converting member includes a plurality of sub-wavelength converting members, and the flexible glass film includes a plurality of sub-flexible glass films corresponding to the plurality of sub-wavelength converting members.

11. A display device comprising:
a backlight unit; and
a display panel disposed above the backlight unit, wherein the backlight unit includes:
a light guide plate;
a housing which is disposed at one side of the light guide plate and accommodates a wavelength converting member; and
a flexible glass film which covers one side of the housing, and
a first laser welding part is disposed between the flexible glass film and the housing.

12. The display device of claim 11, wherein the flexible glass film includes:
a cover portion which covers the one side of the housing;
a spaced-apart portion overlapping the light guide plate and spaced apart from the light guide plate; and
a contact portion contacting the light guide plate.

13. The display device of claim 12, wherein a second laser welding part is disposed between the light guide plate and the contact portion.

14. The display device of claim 11, wherein a thickness of the flexible glass film is in a range of about 5 micrometers to about 50 micrometers.

15. The display device of claim 11, wherein the first laser welding part includes a continuous welding line.

16. The display device of claim 11, wherein a second laser welding part is disposed between the light guide plate and the housing.

17. The display device of claim 11, wherein:
the display panel includes a first substrate and a second substrate facing each other; and
the flexible glass film includes a cover portion which covers the one side of the housing and a panel contact portion extending from the cover portion and welded to the first substrate.

18. A method of manufacturing a display device, the method comprising:
preparing a light guide plate and a housing which is disposed at one side of the light guide plate and accommodates a wavelength converting member; and
placing a flexible glass film at one side of the housing and welding the housing and the flexible glass film using a femtosecond laser.

19. The method of claim 18, wherein:
the flexible glass film includes a cover portion welded to the housing, a spaced-apart portion extending from the cover portion, and a contact portion extending from the spaced-apart portion and contacting the light guide plate; and
the method further comprises welding the light guide plate and the contact portion using a femtosecond laser.

20. The method of claim 18, further comprising welding the light guide plate and the housing using a femtosecond laser.

21. The backlight unit of claim 1, wherein the housing further includes a cover glass disposed at the one side, and the first laser welding part is disposed between the cover glass and the flexible glass film.

* * * * *